No. 793,155. PATENTED JUNE 27, 1905.
A. H. PIPER.
MACHINE FOR FORMING ROLLS FROM DOUGH.
APPLICATION FILED AUG. 31, 1903.
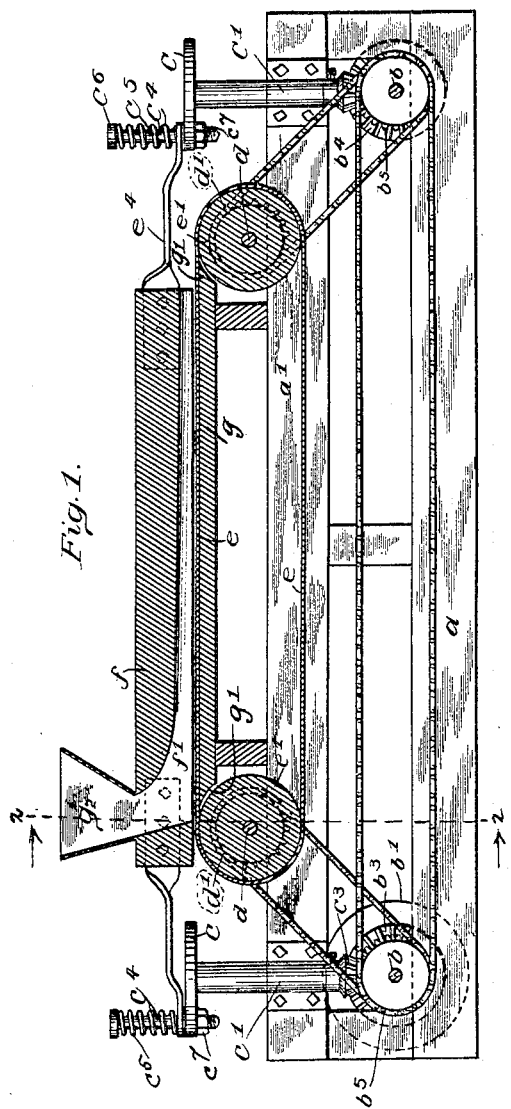
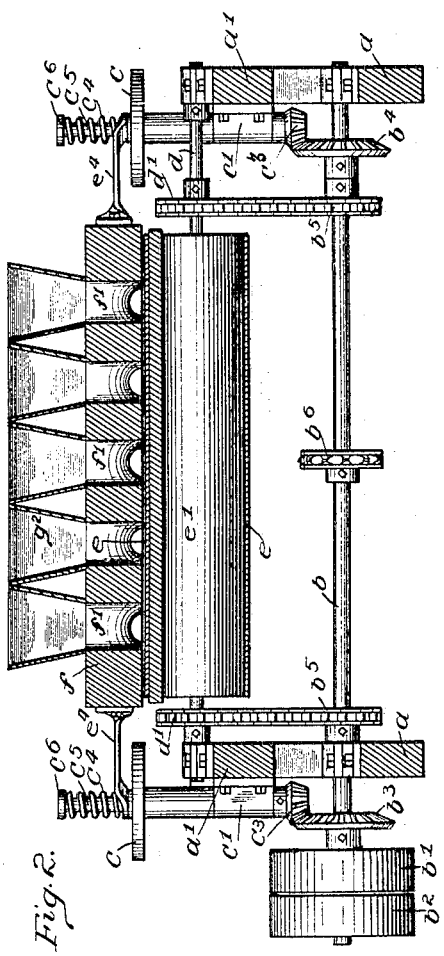
Witnesses:
John Braunwalder,
W. B. Moore
Inventor:
Adolph H. Piper,
By Frederick Benjamin
Atty.

No. 793,155. Patented June 27, 1905.

UNITED STATES PATENT OFFICE.

ADOLPH H. PIPER, OF CHICAGO, ILLINOIS.

MACHINE FOR FORMING ROLLS FROM DOUGH.

SPECIFICATION forming part of Letters Patent No. 793,155, dated June 27, 1905.

Application filed August 31, 1903. Serial No. 171,459.

*To all whom it may concern:*

Be it known that I, ADOLPH H. PIPER, a citizen of the United States, residing at Chicago, in the county of Cook and State of Illinois, have invented certain new and useful Improvements in Machines for Forming Rolls from Dough, of which the following is a specification.

My invention relates to machines for manipulating dough for bakers' use; and the particular objects of the invention are the production of a machine which will convert lumps of dough of more or less irregular shapes into spherical forms in the manufacture of bread and rolls, whereby the manual handling of the dough which is now commonly resorted to in so shaping it is avoided.

In the accompanying drawings I have shown preferred embodiments of my invention, but desire to be understood that the mechanical principles herein set forth permit of varied treatment when embraced in a machine of the character referred to, and I therefore do not wish to be limited to the particular construction and arrangement shown.

In the said drawings, Figure 1 is a longitudinal section through a machine of the character described, and Fig. 2 is a cross-section of Fig. 1 on the lines 2 2.

In detail $a$ and $a'$ represent the timbers composing the frame on which the operative parts of the machine are supported.

$b$ represents the main drive-shaft, on the outer end of which are mounted tight and loose pulleys $b'$ $b^2$ and on which are also carried beveled gears $b^3$ $b^4$ and sprocket-wheels $b^5$ $b^6$. Meshing with the gears $b^3$ $b^4$ are beveled pinions $c^3$ $c^3$, respectively, which are fixed on the lower ends of the vertical shafts $c'$, on the upper ends of which are horizontally-mounted disks $c$ $c$. Journaled in the upper part of the frame-timbers and near the ends of the machine are shafts $d$ $d$, near the ends of which are mounted sprocket-wheels $d'$ $d'$, over which travel sprocket-chains which mesh with the sprocket-wheels $b^5$ on the drive-shaft, thereby transmitting motion to said shafts $d$ from the main drive-shaft.

On the shafts $d$ $d$ are mounted rollers $e'$ $e'$, over which travel an endless carrier $e$, preferably made of canvas. Above the endless carrier is a molding-board $f$, which extends the full width of the carrier and substantially its entire length and has formed in the under side thereof a series of longitudinal channels $f'$. Said channels vary in their vertical diameter, being larger at the left-hand end of the machine, which is where the dough enters, and gradually tapering to the opposite end, where their vertical diameter is sufficient to permit the rolls or spheres of dough to pass out from said channels in finished form. Communicating with the channels $f'$ at their point of greatest diameter are hoppers $g^2$, which are adapted to receive the lumps of dough of irregular shape, but of proper weight to form rolls of predetermined size. The lumps fall by gravity through the hoppers upon the carrier $e$, by which they are conveyed from one end of the machine to the other and are gradually compressed in their passage through the channels $f'$ by the converging walls of the latter, as will be readily understood.

On the upper ends of the shafts $c'$ are mounted disks $c$, near the periphery of which are fixed vertical posts $c^4$, extending upwardly, upon which are loosely mounted the outer ends of spring-arms $c^4$, the inner ends of which are rigidly secured to the molding-board $f$, one arm being secured at each of the four corners of the machine. As the disks revolve a gyratory motion in horizontal planes is imparted through the spring-arms $c^4$ to the molding-board. In order that there may be a yielding pressure exerted by the molding-board on the dough, springs $c^5$ surround the posts $c^4$ and have their upper ends bearing against the heads $c^6$ of said posts and their lower ends bearing on the spring-arms. The posts are threaded on their lower ends, which pass through openings in the disks, and are provided with nuts $c^7$, which upon being screwed up or down regulate the tension of said springs $c^5$ in a manner which will be readily understood.

I may provide any suitable number of channels in the molding-board, or in some instances where it is not essential to give the dough a spherical form I may make said board plane on its under surface, as I find that the gyratory motion of a board combined with a capacity to yield under pressure from below will cause the lumps of dough to assume a more or less spherical form.

To support the endless carrier between its carrying-rollers, I provide a rigid table $g$, the top of which lies close to the carrier and the ends $g'$ of which are curved to conform to the sides of the rollers, so that the said table furnishes a firm support for the carrier throughout its effective portion. Any convenient means may be provided for receiving the rolls after they have traversed the carrier; but same forms no part of this invention.

Having thus described my invention, what I claim as new, and desire to secure by Letters Patent, is—

1. In a machine for manipulating lumps of dough means for supporting the dough, a molding-board yieldingly mounted above said means and having a gyratory motion, said board being provided with elongated channels and means for causing the dough to travel longitudinally through said channels.

2. In a machine for manipulating lumps of dough, a table and a molding-board having a yielding relation therebetween, and said table and board having a gyratory motion relative to each other, and means for conveying the lumps of dough from one end of said table to the other while subjected to the relative action of said table and molding-board.

3. In a machine of the class described, a table, a molding-board yieldingly mounted above said table and having a gyratory movement in a horizontal plane, said molding-board being provided with channels in its under side, and hoppers communicating with said channels.

4. In a machine for manipulating lumps of dough, a carrier for supporting the dough, and a molding-board disposed above said carrier and having a gyratory motion in a plane parallel with said carrier, said molding-board being provided on its under side with grooves disposed parallel with the direction of motion of said carrier.

5. In a machine for manipulating lumps of dough, a carrier for supporting the dough, and a molding-board disposed above said carrier and having a gyratory motion in a plane parallel with said carrier, said molding-board being provided on its under side with grooves disposed parallel with the direction of motion of said carrier, and hoppers communicating with said grooves.

6. In a machine of the kind specified, a traveling belt forming a table for supporting and transporting lumps of dough, a molding-board disposed above said belt and having a gyratory motion in a plane parallel with the supporting-surface of said belt, said molding-board being provided in its under side with grooves disposed parallel with the direction of motion of said belt.

7. In a machine of the kind specified, a traveling belt forming a table for supporting and transporting lumps of dough, a molding-board disposed above said belt and having a gyratory motion in a plane parallel with the supporting-surface of said belt, said molding-board being provided in its under side with grooves disposed parallel with the direction of motion of said belt, and hoppers communicating with said grooves.

8. In a machine of the kind specified, the combination with a plane supporting-surface for lumps of dough, of a molding-board having a gyratory motion in a plane parallel with said supporting-surface, said molding-board being provided in its under side with concave recesses enlarged at one point for the admission of lumps of dough.

9. In a machine of the kind specified, the combination with a plane supporting-surface for lumps of dough, of a molding-board having a gyratory motion in a plane parallel with said supporting-surface and disposed above the same, said molding-board being provided in its under side with longitudinal grooves receiving lumps of dough at one end and delivering same at their other ends, the delivery ends of said grooves being contracted.

10. In a machine of the kind specified, the combination with a plane supporting-surface for lumps of dough traveling in one direction, of a molding-board yieldingly supported above said supporting-surface and having a gyratory motion in a plane parallel therewith, said molding-board being provided in its under side with concave grooves disposed parallel with the direction of motion of said supporting-surface.

11. In a machine of the kind specified, the combination with a plane supporting-surface for lumps of dough traveling in one direction, of a molding-board yieldingly supported above said supporting-surface and having a gyratory motion in a plane parallel therewith, said molding-board being provided in its under side with concave grooves disposed parallel with the direction of motion of said supporting-surface said grooves being contracted at their delivery ends, whereby the dough is gradually compressed.

In testimony whereof I affix my signature in presence of two witnesses.

ADOLPH H. PIPER.

Witnesses:
F. BENJAMIN,
WM. B. MOORE.